2,971,240
Patented Feb. 14, 1961

2,971,240

FIRING OF LIME REFRACTORIES

Albert L. Renkey, Pittsburgh, Pa., assignor to Harbison-Walker Refractories Company, Pittsburgh, Pa., a corporation of Pennsylvania No Drawing. Filed Apr. 22, 1959, Ser. No. 808,014

3 Claims. (Cl. 25—157)

This invention relates to the firing of refractory shapes, such as brick and block, in which free lime (CaO) is the major refractory constituent, in a way that renders the lime highly resistant to hydration.

Almost from the beginning of the refractory industry, there have been repeated attempts to convert lime to a useful form which would make possible its application in furnace construction. This has been greatly desired because calcium oxide (CaO) has a higher melting point than most other oxides, and because limestone in good purity is of widespread occurrence. The fact that there has been almost no commercial success in producing shaped lime refractories is due to the fact that calcium oxide has a great affinity for moisture, the resulting hydration causing complete destruction through disintegration or powdering.

Commercial lime ordinarily is derived from limestone which is burned to drive off the carbon dioxide. The resulting product is the lime or quicklime of commerce which has uses in industry and for soil treatment. An equally common article of trade is hydrated lime which is prepared by adding sufficient water to quicklime to convert it to calcium hydroxide, (Ca(OH)$_2$), generally marketed in dry powdered form. No matter which of these forms is used for refractory purposes, the final product, as a result of high temperature firing, will be calcium oxide, sometimes called calcia. Also past experience has shown that regardless of the source of lime or the process of manufacture, the shaped refractories are of little value since they are so prone to hydration.

Attempts made heretofore to overcome this problem have involved the use of various additives to prevent reaction between lime and water. These additives have been found to give some degree of protection. However, when success has been attained in appreciably inhibiting that reaction, it has been observed that the additive has brought about a radical change in properties in the resulting product from that expected, and the refractoriness of the product has been significantly lowered.

Another approach to the problem, which has given partial success, has been to fuse the lime. However, this procedure, besides being extremely expensive, has not resulted in producing bodies which can be exposed to normal atmospheric conditions for any appreciable length of time.

It is a major object of the present invention to provide a novel method of firing refractory shapes containing free lime as the major refractory constituent to provide a lime refractory which is highly resistant to hydration.

My invention is concerned only with the step of firing the lime refractory and has little or nothing to do with the steps preliminary to or subsequent to firing. Nevertheless, it is so vital to the manufacturing of a marketable lime refractory that without it, all other precautions taken to secure hydration protection fail to accomplish the objective.

Prior workers in this field established that if a lime refractory was to be produced in the form of shaped articles, the starting material would necessarily be calcium oxide, that is, burned lime. Following the practice which is normal for many types of refractories, lime, either as the oxide or hydrate, with or without additions, is burned to some temperature above about 2800° F. for the purpose of densifying or sintering it. Dense grains are desired for the manufacture of refractories, regardless of type. The sintered lime is crushed, the grains graded for good compaction, lubricating agents added if required, and the batch is pressed into shapes such as brick. These brick are then fired to give the final ceramic bond.

It is at this stage that prior workers have experienced insurmountable difficulties due to hydration. In fact, hydration of the lime refractories due to exposure to air has typically proceeded so rapidly that it has not been possible to recover a usable product from the kiln. The brick within the kiln are found to be hydrated either to the degree of complete disintegration, or at least to the extent of showing severe cracking.

Although I have spoken of this disintegration as being the result of hydration, I am not sure that hydration is the only cause or even the major contributing cause and do not wish to be limited by that theory. However, that has been the conclusion of prior workers and appears to be the most reasonable one. But, whatever the cause, my invention greatly retards this breakdown.

Perhaps the best measure of the prior art in this field is obtained by noting the most recent patents. Whittemore in U.S. 2,876,122 has found some use for refractory articles with a high percentage of free lime, but to produce them he found it necessary to resort to complete fusion to prepare the grain. Even with this most expensive of all densifying processes, his limited degree of success is expressed in the statement in column 2, lines 12 to 14, "It is surprising that articles made in this way can withstand climatic conditions of the summertime in Massachusetts for as long as two weeks without deterioration." My invention which is applicable to lime which is either completely fused as Whittemore's, or only sintered, extends this life to a period of months. A three months' life (which is not unusual for my product) compared to only two weeks' life is an increase of over 600%. This is particularly significant since no degree of advanced planning can assure that refractory materials for a furnace lining can be produced, shipped, and installed within a two week period. Even a slight delay enroute would spell failure for such a product. Consequenlty, my invention provides added utility for such lime products as Whittemore's and an essential improvement for many applications.

Similarly, I have found that the additions of titania and zirconia, described by Hathaway in U.S. 2,678,887, and of titania alone, described by Fisk in U.S. 2,548,471, give lime products which are greatly improved by my invention. An important result is the freedom from cracks in the fired product when efforts are made to produce refractories of any substantial size, such as brick, 9 x 4½ x 2½ inches. This cracking is prevented by my firing step. Actually, the improvement derived from my invention is so great that the titania and zirconia additions may be completedly omitted.

I have concluded that lime as a refractory will always require special handling, but I have found that with my solution to the problem it is altogether possible to provide shaped refractories such a life as allows them to be shipped great distances and handled by normal means for furnace construction. Once they are so utilized, the heat present in an operating furnace will keep them from hydrating.

My invention consists in the process step of subjecting a shaped lime refractory to a flash firing. This is a procedure wherein the unburned refractory shape is almost instantaneously raised to at least 1000° F., preferably 1500° F. The rate of further temperature rise to the final firing temperature of 2500° F. to 3000° F. is not critical and can be chosen in accordance with the capabilities of the available equipment. Further, I find that the cooling rate of the burned refractory shape, considered by some prior workers to be critical, is without significance on the resulting product. As a consequence of my unique firing step, brick are no longer observed to be cracked or further disintegrated upon cooling the kiln.

I have attempted to understand why a flash firing should play such an important role in securing stable lime refractories. I believe that in the past other workers and I have incorrectly considered the hydration problem as one of preventing hydration of lime refractories after they have been fired, while neglecting the problem of protecting them during the heat-up.

There are many ways by which moisture may find its way into a kiln where brick are fired. For example, the products of combustion of the fuel itself can provide moisture because water is a product of the combustion of natural gas, oil or coal. This moisture can react with the lime to form calcium hydroxide and thereby damage the brick. This reaction, however, does not occur appreciably at temperatures above 1000° F.

There are several methods by which this rapid heating rate, or flash firing, can be achieved in practical applications. For example, the refractory shape can be placed in a kiln having an entrance temperature of at least about 1000° F.; the outside of the shapes will rapidly, i.e., in a few minutes, achieve the temperature of the kiln. Alternatively, the shapes can be fired by placing them in a kiln at room temperature and rapidly raising the temperature to at least about 1000° F. within a period of 5 minutes or less and at least about 1500° F. within a period of 15 minutes or less. In these procedures, the time at a temperature below 1000° F. has been found to be so short that the normal reaction of water vapor and lime is essentially prevented and the body will be fired without hydration occurring. It has been found that the rapid heating of only the outside surface of the shapes will accomplish my purpose. The interior of the body will, of course, not be at 1000° F. until sometime after the surface, but the lime material is apparently not so permeable that water vapor in the kiln will penetrate the interior before it is heated up over 1000° F. The type of kiln used, e.g., tunnel kiln, periodic kiln, etc., is not important as long as the necessary temperatures can be reached within the periods specified above.

Refractory compositions with which the present invention is used are those in which free lime is present as the major component, that is comprises at least 50 weight percent of the refractory shape. The invention can be practiced with compositions of lime alone or with lime containing those additions which contribute in some way to the brick making art, the compositions in any case being rendered hydration resistant by my flash-firing process. The process is also applicable to refractories made of dead burned dolomite. While dolomite refractories are successfully produced for industry, the hydration problem does exist and my flash-firing process reduces losses of ware in firing. My invention is also useful for compositions that are blends of burned lime or dolomite, or both, with dead burned magnesia; the latter diminishes the effects of the lime but does not eliminate the hydration problem. My invention is applicable to refractory bodies composed of electrically fused lime or dolomite as well as the sintered variety. When a lubricant is used in the batch, the usual water-free lubricants such as oil, tar and paraffin wax can be used.

While the present invention greatly increases the useful life of lime refractories, storage will remain a problem. I therefore find it practical to employ such well-known devices as spraying the fired brick with oils to prolong their life still more, protecting both the burned lime and the fired refractories in containers and wrappings which minimize their contact with air, and in blending with other refractory materials such as magnesia, confining, where possible, the lime-bearing ingredient to the coarser fractions of the mix to reduce the proportion of surface area attributable to the lime. It will be understood that these manufacturing aids are not part of my invention.

Typical practice of the invention is exemplified in the following examples in which the details are given by way of illustration, and are not to be construed as limiting the invention.

Example I

A lime refractory batch was made with the following materials, in parts by weight:

| | |
|---|---|
| Hydrated high calcium lime | 100 |
| Red iron oxide ($Fe_2O_3$) | 5 |
| Caustic magnesia ($MgO$) | 2 |

Water was added to the batch in an amount of 66.5 weight percent, based on the solids, and the resulting mix was vacuum extruded. It will be noted that water has no harmful effect when used in preparing the refractory grain for burning. The extruded material was then fired at 2800° F. to densify the material and calcine it. This calcined material was ground to various sizes, called grog, and a brick mix prepared. A Tyler screen analysis, in weight percent, of the mix is as follows:

| | Percent |
|---|---|
| −4+10 | 15 |
| −10+28 | 30 |
| −28+65 | 15 |
| −65 | 20 |
| Ball milled | 20 |

Two weight percent of melted paraffin was added to the heated mix and bricks, 9 x 6 x 3½ inches, were formed by pressing at about 5000 p.s.i. The brick were placed in a kiln and the temperature rapidly raised to 2685° F. It was noted that the kiln temperature reached 1000° F. in 3 minutes and 1500° F. in 9 minutes. The final temperature of 2685° F. was held for five hours. After cooling to handling temperature, the brick were examined and found to have smooth surfaces. All were in satisfactory condition for actual use. Physical measurements showed an average shrinkage of 1.3 percent and a modulus of rupture of 1830 pounds per square inch.

The essential purpose of this invention is to provide refractory shapes that contain hydratable lime, which are stabilized against deleterious reaction with water for a reasonable period of time, at least one to two months. Stabilization for longer periods can be attained by coating products prepared in this invention with oil or similar water-resisting material.

Brick prepared in accordance with Example I have actually been installed and tested in a commercial, coal-fired, rotary lime kiln. Five of these brick were installed in the kiln so that they extended inwardly about one inch beyond the surrounding regular brick in the kiln. After 105 days of actual operation plus a total of 42 days of down-time, distributed as intervening periods throughout the operation, the kiln operator reported the brick to still be in superb condition. This is considered to be compelling evidence of the unusual characteristics of these brick, because by their physical location in the kiln they are being subjected to unusually abrasive conditions. Notwithstanding these severe operating conditions, no cracks or incipient spalling in the lime refractories have been observed.

Brick of 100 percent lime have also been prepared.

Example II

Brick of substantially 100 percent lime were prepared as follows: A mix containing, by weight, 100 parts of hydrated high calcium lime and 60 parts of water was extruded under vacuum. The resulting material was dried and then densified by firing at 3000° F. The bulk specific gravity of the resulting grog was 3.05. The grog was ground and mixed in various sizes. A Tyler screen analysis of the mix, in weight percent, was as follows:

| | Percent |
|---|---|
| −4+10 | 15 |
| −10+28 | 30 |
| −28+65 | 15 |
| −65 | 20 |
| Ball milled | 20 |

The batch was heated to about 230° F. and then two weight percent of melted paraffin was added and thoroughly mixed therewith. Brick, 9 x 6 x 3½ inches, were formed from this mix and pressed at about 5000 p.s.i. The brick were placed in a kiln and the temperature was raised rapidly to 2685° F. and held for five hours. It was noted that the kiln temperature reached 1000° F. in 3 minutes and at the end of 9 minutes was 1500° F. After firing the brick were removed. Physical measurements showed that the average shrinkage was about 0.2 percent. Tests showed that the brick had a modulus of rupture in excess of 1500 p.s.i. Their storage life was similar to the brick of Example I. When sprayed with machine oil they were usable after four months' storage.

In testing this invention and determining the criticality of flash firing, comparison runs were also made. For example, brick were prepared with the same composition and according to the same procedure as in Example I. They were placed in a kiln at room temperature and then were fired in accordance with a normal firing schedule for refractory brick. The kiln temperature was raised about 60° F. per hour, reaching 1000° F. in about 16 hours and 1500° F. in about 24 hours. The final temperature of about 2800° F. was held for ten hours. On cooling the kiln, the brick were observed to have broken down into a heap of small chunks.

In other tests an accelerated firing schedule was used. Brick of the composition of Example I and prepared in the same manner were placed in a kiln at room temperature and the temperature was rapidly raised to 2800° F. The temperature rise was such that the kiln reached 1000° F. within 30 minutes and 1500° F. within 45 minutes. The final temperature of 2800° F. was held for ten hours. On cooling the kiln and examining the brick, it was observed that cracking had occurred which precluded the use of the brick in furnace applications. Many of the cracks were concentrated in the area of the brick adjoining the hearth. Because of the greater mass of material at this point, it is believed this portion of the lime brick was, to some extent, cooled by the hearth so that its temperature increased more slowly than the remainder of the brick. During this firing schedule several brick were inserted directly into the kiln when the temperature reached 1500° F. These brick showed no cracking and were otherwise satisfactory.

As noted above, the processing details other than flash-firing can be varied. If desired, longer or shorter firing schedules can be used depending on the composition, the size of the refractory and the desires of the operator. The final firing temperature can range from 2500° to 3000° F. Similarly, the shaping and densifying of the raw materials can be varied. For example, the grog can be obtained by power pressing at 1000 p.s.i., followed by calcining and crushing. However, vacuum extrusion is preferred. If desired, sulfite waste liquor, dextrine or other binder in small amounts can be included in the batch prior to calcining to facilitate handling.

From the foregoing it is apparent that my invention provides a practical, conveniently practiced method of burning free-lime-containing refractories. Refractory products produced in accordance with the invention can be used for applications that require high temperature, for example on the order of 4000° F. and higher, for extended periods of time. Typical applications include use as a lining material in cement kilns as well as in oxygen convertors, and in other equipment in which processes are conducted at very high temperature.

In accordance with the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. In a method of preparing refractory shapes of a composition that includes at least 50 weight percent of free lime, the step comprising firing the shape in a manner to raise its temperature to at least 1000° F. within a period of time that does not exceed about 5 minutes, to produce a lime refractory that is resistant to hydration.

2. In a method of preparing refractory shapes of a composition that includes at least 50 weight percent of free lime, the step comprising firing the shape in a manner to raise its temperature to at least 1500° F. within a period of time that does not exceed about 15 minutes, to produce a lime refractory that is resistant to hydration.

3. In a method of preparing refractory shapes of a composition that includes at least 50 weight percent of free lime, the step comprising firing said shape in a manner that includes introducing the unburned shape into a heated kiln maintained at a temperature of at least 1000° F., to produce a lime refractory that is resistant to hydration.

References Cited in the file of this patent

UNITED STATES PATENTS

| 1,628,910 | Prouty et al. | May 17, 1927 |
| 2,371,353 | Parsons | Mar. 13, 1945 |